United States Patent [19]

Kubinsky

[11] 4,131,705

[45] Dec. 26, 1978

[54] STRUCTURAL LAMINATE

[75] Inventor: Eugene J. Kubinsky, Shelton, Wash.

[73] Assignee: International Telephone and Telegraph Corporation, New York, N.Y.

[21] Appl. No.: 830,471

[22] Filed: Sep. 6, 1977

[51] Int. Cl.² .................. B32B 5/12; B32B 5/14; B29D 3/02; D04H 1/16

[52] U.S. Cl. .................................. 428/106; 264/108; 428/114; 264/112; 264/113; 428/165; 428/171

[58] Field of Search ............... 428/106, 114, 151, 156, 428/165, 171, 172; 264/108, 112, 113

[56] References Cited

U.S. PATENT DOCUMENTS

| | | | |
|---|---|---|---|
| 2,429,235 | 10/1947 | Miskelly et al. | 428/106 |
| 2,847,733 | 8/1958 | Roy | 428/151 |
| 3,115,431 | 12/1963 | Stokes et al. | 264/113 |
| 3,447,996 | 6/1969 | Himmelheber et al. | 264/113 |
| 3,793,125 | 2/1974 | Kunz | 264/112 |
| 3,846,219 | 11/1974 | Kunz | 428/165 |

*Primary Examiner*—William R. Dixon, Jr.
*Attorney, Agent, or Firm*—J. B. Raden; H. J. Holt

[57] ABSTRACT

A structural laminate having a groove impressed on its surface useful as an external siding. The laminate comprises an outer wood face veneer, the grain of which is oriented along a given direction, and at least two particle board plies, the particle board ply nearest the outer face veneer having a particle orientation along a direction perpendicular to the grain of the face veneer, the other of said particle board plies having a particle orientation along the same direction as the face veneer. The composite laminate is produced in a single pressing operation in which the groove is pressed into the outer surface during the pressing of the plies into a composite laminate.

11 Claims, 1 Drawing Figure

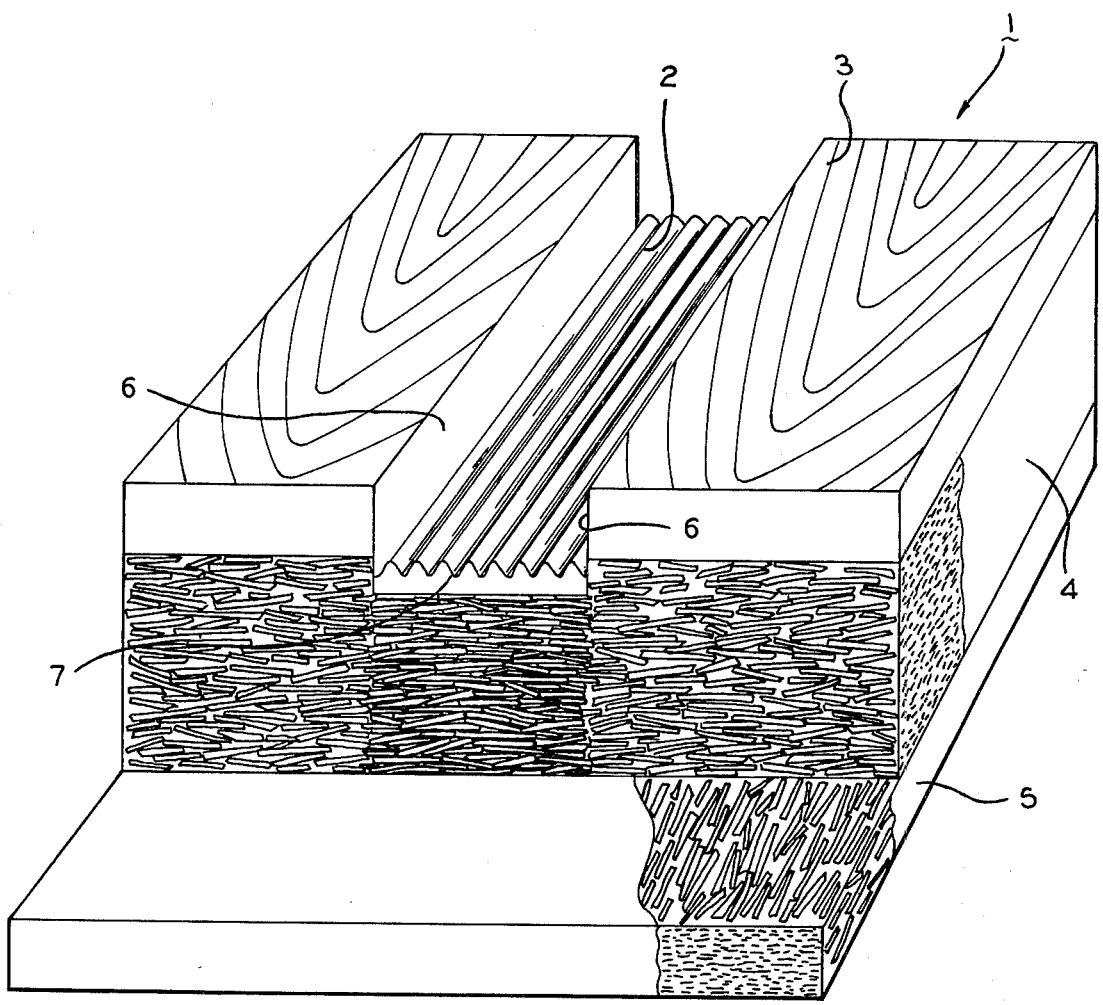

STRUCTURAL LAMINATE

This invention relates to a structual laminate having a pattern impressed therein and to a process for its production. It particularly relates to a structural laminate useful for exterior siding.

Cedar wood is widely used as exterior siding because of its desirable grain and color, its durability and its relatively maintenance-free characteristics. It has traditionally been produced with a groove pattern containing striations to resemble a "reverse board and batten" pattern. The configuration of this groove, creating a distinct shadow effect, is an important characteristic of its acceptance from an appearance standpoint.

Exterior siding is normally produced as a plywood laminate made up of a number of wood veneer plies, usually cedar and Douglas fir, the groove configuration being machined by routing after the laminate is formed. Substantial raw material and cost savings would result from the substitution of particle board for one or more of the plies of such siding and such substitution has been suggested for the interior plies. However, particle board cores create problems in pressing such laminates because particles carry over onto the hot plates of the press and stick to one of the veneer surface plies requiring separate pressing operations for the particle board plies. Moreover, when the groove is machined into the face veneer, the particle core is exposed and this is undesirable from an appearance standpoint. Grooves have been pressed into particle board but it has not been possible to press a groove of the desired configuration into a wood veneer. It has thus not been possible to produce an acceptable composite wood product having the desired characteristics of cedar or other wood exterior siding.

It is accordingly a principal object of this invention to provide a structural laminate having an embossed groove design and possessing the properties, characteristics and appearance of wood siding.

It is an additional object of this invention to produce by a single pressing operation a composite structural laminate having a wood face veneer and an embossed groove design.

It is an additional object of this invention to provide a structural laminate having a groove pattern useful as exterior siding which achieves substantial savings in both raw material and manufacturing costs.

The foregoing and other objects of the invention are achieved in a composite structural laminate comprising an outer wood face veneer, the grain of which is oriented along a given direction and at least two adjacent plies of particle board, the particle board ply nearest the outer face veneer having a particle orientation along a direction perpendicular to the grain of the face veneer, the other of the particle board plies having a particle orientation along the same direction as the face veneer, the laminate containing at least one groove therein pressed into the outer surface of the laminate along the direction of the grain during the pressing of the plies into a composite laminate. The composite laminate and groove are produced in a single pressing operation by pressing together under heat and pressure the wood face veneer and two or more layers or mats of the unconsolidated particle board, the particles and wood veneer of adjacent plies being oriented perpendicular to each other as set forth above and, during the pressing cycle, impressing a groove into the outer surface of the laminate.

The invention will be better understood in connection with the accompanying drawing in which the FIGURE is a perspective view, partially in cross-section, of a structural laminate in accordance with the invention.

In the drawing, numeral 1 generally designates a laminate useful as an exterior siding, containing a groove 2 referred to in the trade as a "reverse board and batten" pattern. The outer ply of the laminate is a cedar veneer 3, the grain of which is oriented along a given direction. Adjacent the cedar veneer are two adjacent plies of particle board, the nearest of the two to the veneer 3 being core ply 4, the particles of which are oriented perpendicular to the grain of the veneer 3. The particles of the inner ply 5 are oriented in a direction parallel to the grain of the face veneer 3 and perpendicular to the particles of core 4. The groove 2 has essentially straight vertical walls 6 and a depressed and embossed horizontal base 7. The base 7 consists of a strip which is cut from the face veneer 3 and pressed into the core of the laminate as it is simultaneously embossed by a suitable die with the striated or sinusoidal pattern illustrated in the drawing.

It will be seen from the foregoing description that the particle core is not exposed in the groove, as it would be for example if the groove were machined, but is rather covered by the depressed veneer strip. Thus, the entire surface of the laminate, including the base of the groove, is made up of the same wood texture, composition, grain direction and color. Moreover, because of the increased density of the core beneath the groove, the product is not weakened but rather reinforced at the groove. Grooves have previously been pressed into particle board or fiber board and in some cases even into wood veneers. However, it has not been previously possible to press such grooves into wood faced products having a so-called "shadow-line," created by the sharply vertical walls of the groove.

The products of the present invention are produced by spraying wood particles or flakes with an adhesive of the type conventionally used in preparing particle board. The treated flakes are formed into a one-directionally oriented bottom mat on a suitable caul plate. A second, thicker layer of the same treated flakes is then formed on the bottom mat and oriented at a 90 degree angle with the bottom layer. An additional thin, oriented (in the fiber direction of the veneer) or randomly formed layer or wood particle fines is preferably provided between the veneer and the cross oriented particle layer to provide a cushioning layer. The cushioning layer avoids embossing problems if the embossing die should strike into the main core layer which is cross oriented. In addition, it provides a better edge on the embossed groove. Moreover, after the board has weathered, the inner core layer has a tendency to spring back and this shows as imperfections in the outer veneer. The layer of fines cushions this spring back effect and prevents the impressing of the thicker flakes into the veneer. Methods for orientation of particles in particle board are known and are disclosed for example in U.S. Pat. Nos. 3,164,511 and 3,202,743 and in an article which appeared in *Plywood and Panel Magazine,* pages 16–19, February 1977. If desired, additional layers of oriented and treated flakes may be formed, each at a 90° angle to the previous layer. The combined mats are then covered with a wood veneer, the bottom side of which may be coated with the same adhesive used to coat the flakes, the grain direction of the veneer being at a 90° angle with the adjacent flake layer. The entire three-layer layup is then placed together with the caul plate between the platens of a press. The top platen may have a hinged embossing caul plate with one or more protruding embossing-cutting dies arranged parallel to the grain direction of the surface veneer. The pressing conditions normally range from about 2000 to 3000 kilo pascals at temperatures ranging from about 140° to 200° C. for times ranging from about 4 to 12 minutes. The grooves may be cut and embossed with the hinged dies immediately after the platens are closed.

The invention is illustrated by the following examples in which all parts and percentages are by weight, unless otherwise indicated.

EXAMPLE I

Eight hundred grams of western red cedar flakes on the average 0.5 mm thick, 4 mm wide and 50 mm long as obtained from processing cedar roundwood or cedar or other wood species wastewood in a drum or ring type flaker respectively at a moisture content of 5% are sprayed with 95.89 g. (6% solids based on O.D., oven dried, furnish) of a 47.7% phenolic adhesive and 11.65 g. (0.75% solids based on O.D. furnish) of a 49% wax emulsion in a rotary blender for approximately 10 minutes. One hundred seventy grams of the treated flakes at a moisture content of approximately 10% are formed into a one-directionally oriented bottom mat layer on a suitable aluminum caul plate. Upon this, an additional 737 g of the same flake furnish is formed into a thicker core layer and oriented at a 90 degree angle with the bottom layer. The combined two-layer crossbanded particle mat is then covered with a 2.8 mm western red cedar veneer, the bottom side of which was roller-coated with 12 g of the same phenolic adhesive, the fiber direction of the veneer being in accord with the particle direction of the bottom flake layer. The entire three-layer veneer/flake layup is then placed along with the caul plate between two hot platens of a hydraulic press, the top platen of which has a special hinged caul plate. The special caul plate is provided with one or more protruding combined embossing/cutting strips which are arranged parallel with the fiber direction of the surface veneer of the sandwich mat to be pressed. Pressing conditions are approximately 2800 kPa at 160° C. for 6 minutes. The resulting board has a thickness of 16 mm and density of 0.58 g/cm$^3$.

EXAMPLE II

Eight hundred and sixty-nine grams of western red cedar flakes on the average 0.5 mm thick, 4 mm wide and 50 mm long as obtained from processing cedar roundwood or cedar waste wood in an appropriate (drum or ring type) flaker at a moisture content of up to 14% are sprayed separately with 45.71 g (6% based on O.D. furnish) of an isocyanate adhesive and 15.55 g of 49% wax emulsion (1% solids based on O.D. furnish) in a rotary blender for about 10 and 5 minutes respectively. Three hundred and twenty-five grams of the treated flakes at a moisture content of approximately 15% are formed into a one directionally oriented bottom mat layer upon an aluminum caul plate sprayed with a special release agent. Upon this an additional 453 g of the same flake furnish is formed into a thicker core layer and oriented at a 90 degree angle with the bottom layer. An additional 151 g of a particle fines furnish sprayed with the same isocyanate adhesive is formed into a thinner layer and oriented at a 90 degree angle to the adjacent core layer and parallel with the bottom layer. The combined three-layer particle mat is then covered with a 2.8 mm western red cedar veneer, the bottom side of which was sprayed with 15 g of the same isocyanate adhesive, the fiber direction of the veneer being in accord with the particle direction of both the top but especially with the bottom flake layer. The entire four-layer veneer/flake sandwich is then placed along with the caul plate between two hot platens of a hydraulic press having a specially designed top hot platen with one or several recessed embossing bars. The combined veneer/flake sandwich is placed in the press with the fiber direction of the surface veneer parallel to the recessed embossing bars. During the pressing operation the composite layup is first compressed to a flush state. Through additional pressure the embossing bars extend from their recess, cut appropriate strips in the surface veneer, depress and shape them into groove patterns. After the completion of the pressing cycle and opening of the press, the withdrawal of the embossing bars into the platen recess helps to separate the finished boards from the hot platens. Pressing conditions are approximately 2800 kPa at 140° C. for 6 minutes. The resulting board is 16 mm thick and has a density of approximately 0.58 g/cm$^3$.

The process of the invention results in a number of process and product advantages. The process eliminates one pressing operation because the particle mats are not separately consolidated. This was previously necessary because, where an inner and outer wood veneer is used, particles carry onto the hot plate and ruin one or the other of the veneers. Since the embossing of the groove pattern is made exclusively from the top side, compressing the composite layup initially to a flush state and subsequently extending the embossing tools in a supplementary pressing cycle, no contamination of the veneer face from stray wood particles or flakes or other foreign objects can occur. Moreover, minor thickness adjustments of the composite boards of the invention can be conveniently made by sanding the inner (backside) particle board layer without disturbing the balance (the tendency to stay flat) of the entire board. The process also permits veneer knot holes to be filled with particles in an acceptable manner. Matforming is carried out on a smooth, flat caul plate or conveying band, rather than on a possibly warped, uneven veneer, thus helping to insure a uniform final density. If the two or more layer mats are found by a monitor to have a non-uniform density, the non-uniform mats can be rejected before the veneer is overlaid and placed in the press. Finally, of course, substantial savings are realized, since a major proportion of processed raw material is the low cost wood residue.

Typically, particle boards are made by consolidating under heat and pressure minor proportions of an adhesive and a wood furnish, variously referred to in the art, as flakes, particles, strands or fibers. The furnish for the particle board plies has been disclosed in the specific examples as cedar flake. However, the particle or flake furnish may consist of other appropriately comminuted hard or softwood sawmill or logging residue. In addition, other lignocellulose furnish may be used including for example that from bark, bagasse, straw or sisal. The particles should have a length to diameter ratio sufficient so that they are capable of alignment such that most particles extend along a given direction parallel to one edge of the lamina. The adhesive may be a phenol, urea or melamineformaldehyde resin or a polyisocyanate. Examples of suitable adhesives are shown in U.S. Pat. Nos. 2,430,479, 3,180,784, 3,309,444 and 3,440,189. While the preferred form of the invention involves the use of an outer veneer of cedar, other wood species may also be used, as for example, Douglas fir, hemlock, sitka spruce or southern yellow pine.

I claim:

1. A structural laminate having a pattern impressed therein comprising
    an outer wood face veneer, the grain of which is oriented along a given direction and
    at least two plies of particle board, said particle board ply nearest the outer face veneer having a particle orientation along a direction perpendicular to the grain of the face veneer, the other of said particle board plies having a particle orientation along the same direction as said face veneer,
    said laminate containing at least one groove therein pressed into the outer surface of the laminate along the direction of the grain during the pressing of said plies into a composite laminate.

2. The structural laminate of claim 1, in which the outer wood face veneer is cedar.

3. The structural laminate of claim 1, in which the groove forms a reverse board and batten pattern containing substantially vertical side walls and a striated base surface.

4. A structural laminate having a pattern impressed therein comprising
    an outer wood face veneer, the grain of which is oriented along a given direction
    at least two plies of particle board, said particle board ply nearest the outer face veneer having a particle orientation along a direction perpendicular to the grain of the face veneer, the other of said particle board plies having a particle orientation along the same direction as said face veneer and
    a ply of wood particle fines between said outer veneer and said particle board ply nearest the outer veneer,
    said laminate containing at least one groove therein pressed into the outer surface of the laminate along the direction of the grain during the pressing of said plies into a composite laminate.

5. A wood surface exterior siding laminate having a reverse board and batten pattern impressed therein comprising
    an outer Western red cedar face veneer, the grain of which is oriented along a given direction and
    two adjacent plies of adhesive bonded wood particle board, the first of said particle boards being adhered to said outer face veneer and forming the core of said laminate, the second of said particle boards being adhered to the first particle board and forming the inner ply of said laminate, the particles of said first particle board being oriented perpendicular to the grain of said face veneer and the particles of said second particle board being oriented perpendicular to the particles of said first particle board,
    the outer surface of said laminate containing an embossed groove therein, the edges of said groove being cut into said laminate, the base surface of said groove forming an embossed striated pattern, said groove being formed during the pressing of said plies into a composite laminate.

6. The laminate of claim 5 in which the adhesive is a phenolic resin.

7. The laminate of claim 5 in which the adhesive is an isocyanate polymer.

8. The laminate of claim 5 having a thin layer of adhesive bonded fines between the outer veneer and the core layer.

9. A process of producing a structural laminate having a pattern impressed therein comprising
    forming at least two layers of particles oriented in a direction perpendicular to each other, each of said layers comprising said particles and an adhesive therefor,
    placing a wood face veneer adjacent one of said layers of particles, the grain of said wood face veneer being oriented along a direction perpendicular to said adjacent particle layer, and
    pressing together under heat and pressure into a composite laminate said particle layers and wood face veneer and, during said pressing operation, impressing at least one groove into the outer surface of said laminate.

10. The process of claim 9 in which the particles of each of said layers is coated with the adhesive and the adhesive is selected from the group consisting of phenolic resins and isocyanate polymers.

11. The process of claim 9 in which the groove is impressed by cutting a strip of said wood face veneer and simultaneously pressing and embossing said strip into the outer surface of said laminate.

* * * * *